No. 708,894. Patented Sept. 9, 1902.
A. G. MACCULLOCH & H. DICKINSON.
CASH REGISTER AND TILL.
(Application filed Nov. 29, 1901.)

(No Model.) 6 Sheets—Sheet 1.

Fig.1.

Witnesses:
Charles Herbert White
Ernest Holmes

Inventors:
Andrew Gilligan Macculloch
Herbert Dickinson
per
Attorney

No. 708,894. Patented Sept. 9, 1902.
A. G. MACCULLOCH & H. DICKINSON.
CASH REGISTER AND TILL.
(Application filed Nov. 29, 1901.)

(No Model.) 6 Sheets—Sheet 4.

Witnesses:
Charles Herbert White
Ernest Holmes

Inventors:
Andrew Gilligan Macculloch
Herbert Dickinson
per White & Woodington
Attorneys No. 708,894. Patented Sept. 9, 1902.
A. G. MACCULLOCH & H. DICKINSON.
CASH REGISTER AND TILL.
(Application filed Nov. 29, 1901.)

(No Model.)
6 Sheets—Sheet 5.

Witnesses:
Charles Herbert White
Ernest Holmes

Inventors:
Andrew Gilligan Macculloch
Herbert Dickinson
per White & Woodington
Attorneys No. 708,894. Patented Sept. 9, 1902.
A. G. MACCULLOCH & H. DICKINSON.
CASH REGISTER AND TILL.
(Application filed Nov. 29, 1901.)
(No Model.)
6 Sheets—Sheet 6.

Witnesses:
C. M. White
E. Holmes.

Inventors:
Andrew Gilligan Macculloch
Herbert Dickinson
By White & Woodington
Attorneys

UNITED STATES PATENT OFFICE.

ANDREW GILLIGAN MACCULLOCH AND HERBERT DICKINSON, OF LONDON, ENGLAND.

CASH-REGISTER AND TILL.

SPECIFICATION forming part of Letters Patent No. 708,894, dated September 9, 1902.

Application filed November 29, 1901. Serial No. 84,122. (No model.)

*To all whom it may concern:*

Be it known that we, ANDREW GILLIGAN MACCULLOCH, gentleman, residing at 11 Palace Mansions, Kensington, and HERBERT DICKINSON, engineer, residing at 2 Camden Gardens, Shepherds Bush, in the county of London, England, subjects of the King of Great Britain, have invented a new or Improved Cash-Register and Till, of which the following is a specification, reference being had to the drawings hereunto annexed and to the reference-numbers marked thereon.

In the several figures like parts are indicated by similar reference-numerals, and Figs. 13 to 18 are drawn to an increased scale with respect to the other figures of the drawings.

Figures 4, 7, 8, 9:
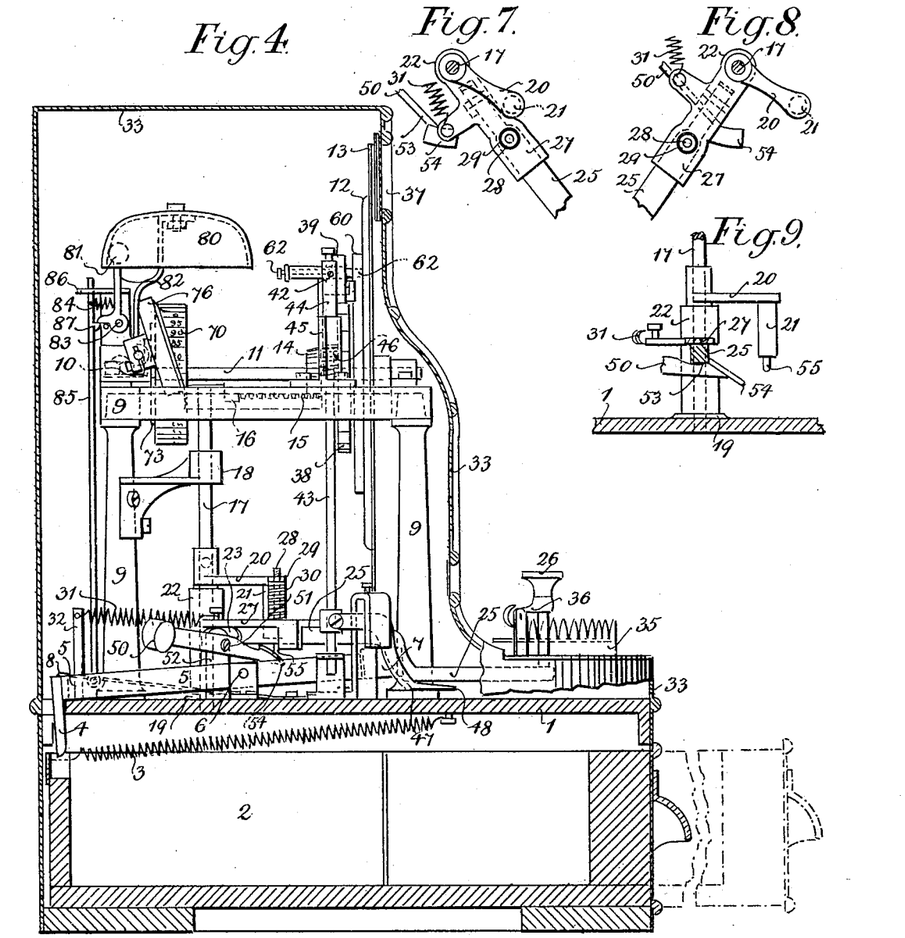
Fig. 4 is a side elevation thereof, partly in section and with the side of the cover partly removed.
Fig. 7 is a plan of the inner end of the key-lever and some adjacent coacting parts, showing the position they assume when the key-lever is at the extremity of its traverse and has been depressed.
Fig. 8 is a similar view, but showing the parts in the position they assume when the key-lever has been returned to its normal or zero position and before it has been depressed.
Fig. 9 is a front elevation thereof, partly in section.
Figure 5:
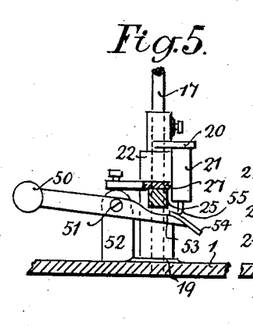
Fig. 5 is a front elevation of parts.
Figure 6:
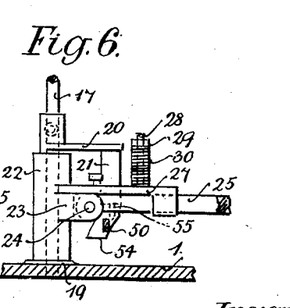
Fig. 6 is a side elevation thereof.
Figure 10:
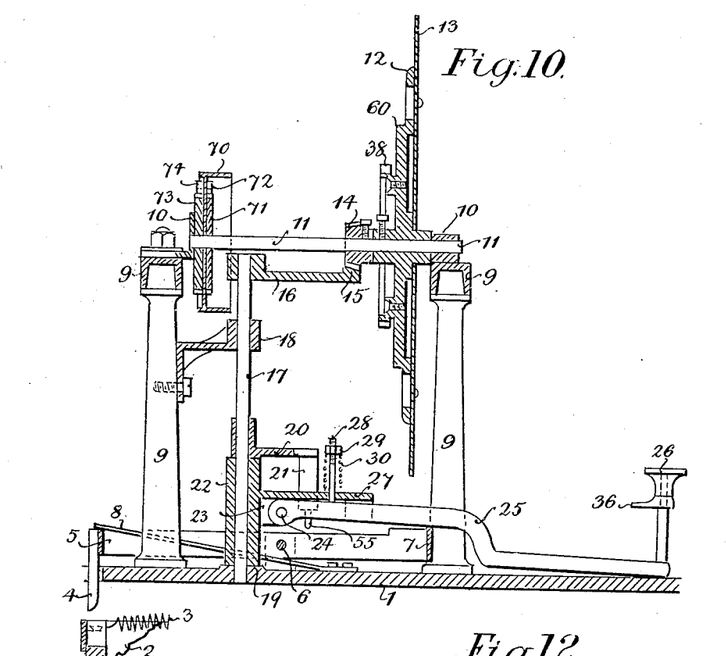
Fig. 10 is a sectional side view showing the principal working parts of the machine.
Figure 11:
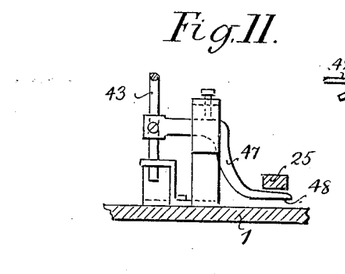
Fig. 11 is a front elevation, partly in section, illustrating the means actuated by the key-lever for restoring the parts to their normal positions.
Figure 12:
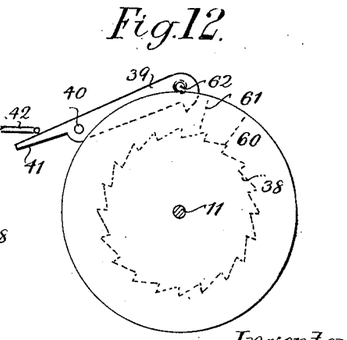
Fig. 12 is a sectional front view of parts.
Figure 13:
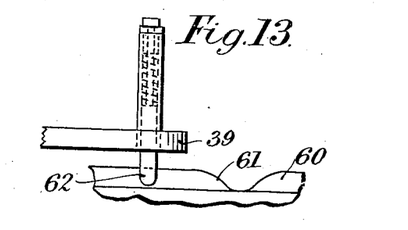
Fig. 13 is a plan of parts, showing the spring-stud riding upon the edge of the coacting disk.
Figure 14:
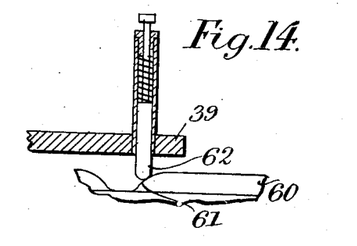
Fig. 14 is a similar view, partly in section, showing the spring-stud being depressed by the inclined side of the recess in the coacting disk.
Figure 15:
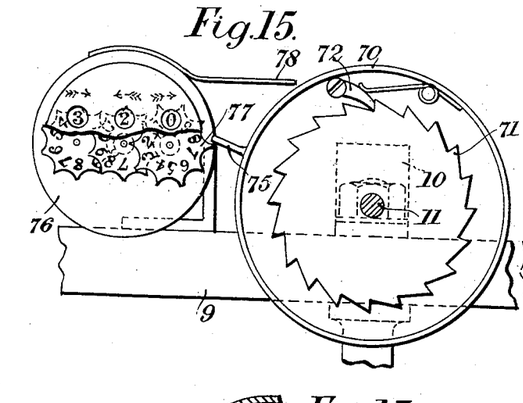
Fig. 15 is an elevation of the counting apparatus and coacting drum.
Figure 16:
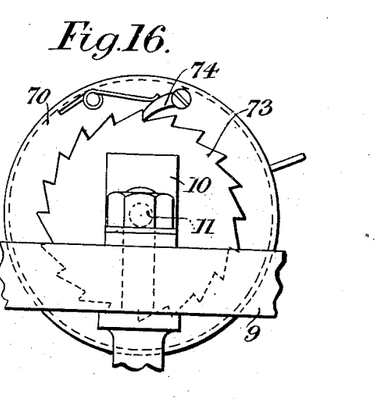
Fig. 16 is a similar but opposite side view of the drum.
Figure 17:
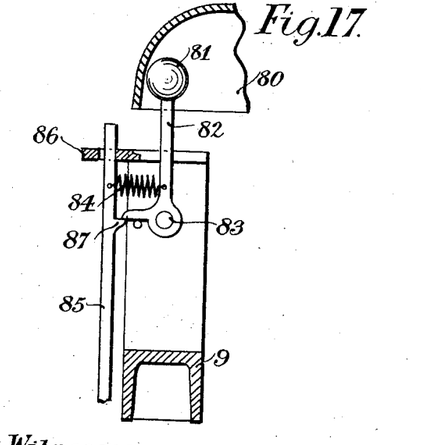
Fig. 17 is a sectional side view of the gong and coacting parts in their normal positions.
Figure 18:
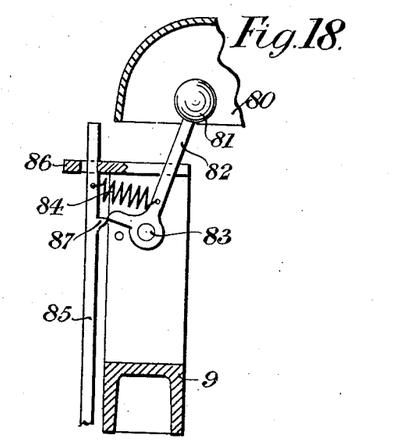
Fig. 18 is a similar view, but showing the hammer retracted and about to be released.

1 represents the base of the machine, which is formed hollow and is provided with a drawer or till 2, which is adapted to slide in and out of an aperture located in the front of the base 1, and the drawer 2 is automatically moved forward or opened at the times desired by means of a coiled spring 3 at one end attached to the base 1 and at the other end to the back of the drawer 2, while said drawer is normally retained in its closed position against the force of the spring 3 by means of a detent 4, which engages the back of the drawer 2. The detent 4 is carried by the rear end of a frame-like lever 5, mounted with capability of rocking upon an axis 6 and acted upon by a spring 8 to normally depress said rear end and hold the detent 4 in engagement with the drawer, and at its front end said lever is provided with a curved or segmental bar 7, which is depressed at the times desired and as hereinafter described to withdraw the detent 4, when the drawer will spring open, as indicated by the dotted lines in Fig. 4.

9 represents the framing of the machine, and mounted with capability of revolution in bearings 10, carried by said framing, is a horizontal shaft 11, upon which is fixed a metal disk 12, to the outer face of which is fixed a dial 13 at its periphery and divided figured "0," "5," "10," "15," and so on to "95" to represent cents. Upon the shaft 11 is fixed a beveled pinion 14, with which engages a segmental rack 15, carried by a quadrant 16, fixed upon the upper end of a vertical shaft 17, mounted in bearings 18 and 19, and upon the vertical shaft 17 is also fixed a crank 20, furnished with a pin 21. Beneath the crank 20 is loosely mounted upon the shaft 17 a sleeve 22, provided with a lug or offset 23, to which is connected by a horizontal pivot at 24 a key-lever 25, at its outer end furnished with a button head or key 26, by the aid of which the lever 25 may be laterally traversed and depressed at the times desired. Projecting from the sleeve 22 is a table or platform 27, and pivotally mounted upon the key-lever 25 is a pin or stud 28, which passes through a perforation in the platform 27 and at its head is fitted with a screw-nut 29, between which and the platform 27 is arranged a compression-spring 30, which serves to normally retain the key-lever 25 in its raised position and to lift it after each depression, while a coiled extension-spring 31, connected to the platform 27, and a fixed post 32 serves to restore the key-lever 25 to its normal or zero position after each lateral traverse.

Figure 1:
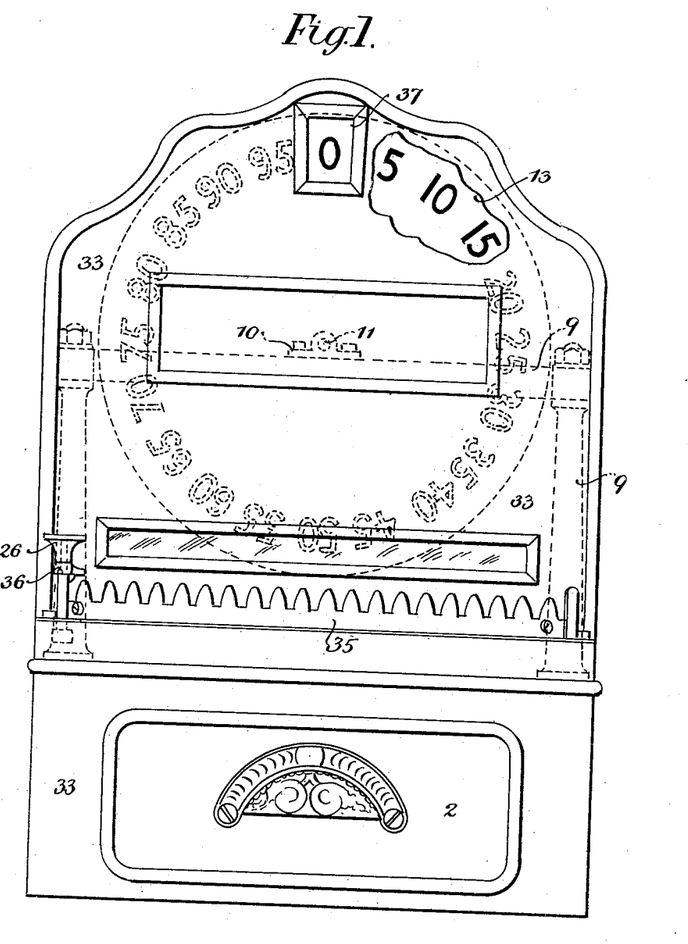
Figure 1 is a front elevation of a machine constructed according to the present invention.
Figure 2:
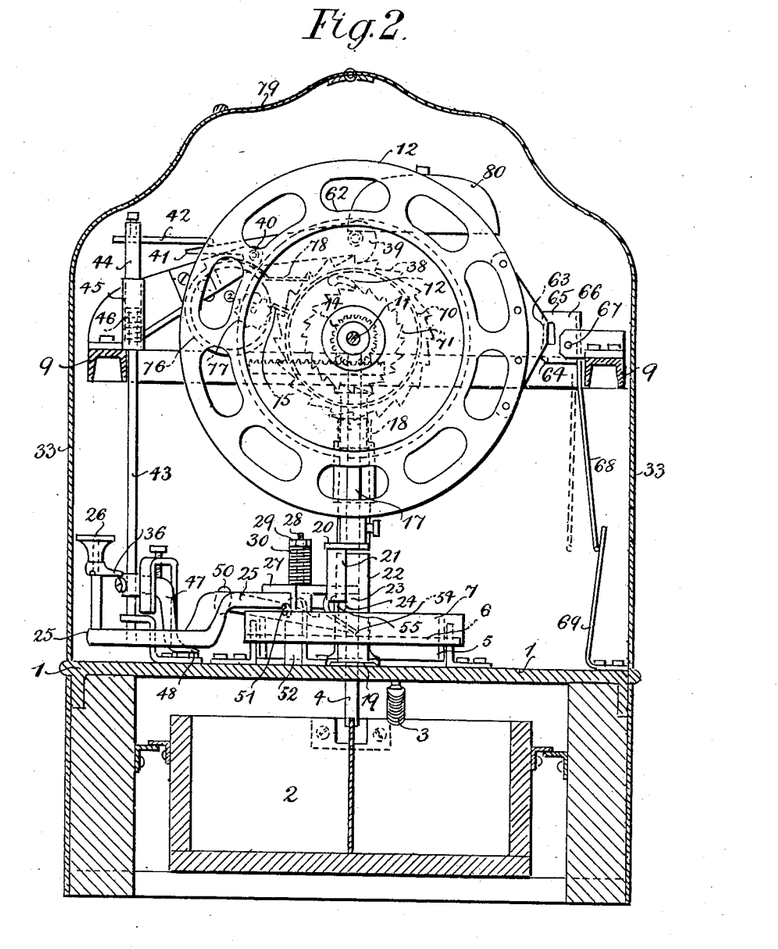
Fig. 2 is a similar view, partly in section and with the front part of the cover removed.
Figure 3:
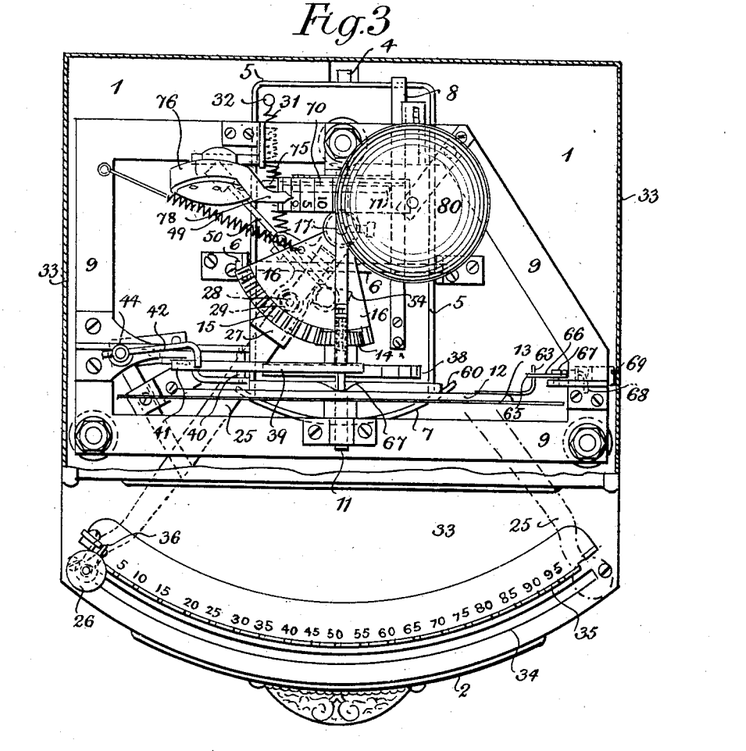
Fig. 3 is a plan thereof with part of the cover broken away.

33 represents the case of the machine, in the front of which is formed a curved slot 34, through which rises the post of the key 26 of the lever 25, and at the rear of the slot 34 is provided a segmental rack 35, which is divided and figured in a similar way to the dial 13, and the key 26 is provided with a finger 36, adapted to enter the notches of the rack 35 when the key 26 is depressed. The case 33 is at the front thereof provided with an aperture 37, and the figured disk 13 is arranged at the back of said aperture, so that the figures thereon can one at a time be exhibited thereat, and thus by laterally traversing the key-lever 25 until the finger 36 is opposite that notch of the rack 35 corresponding with the amount to be registered the disk 13 will through the key-lever 25, crank-pin 21, vertical shaft 17, segmental rack 15, and pinion 14, as shown more particularly at Figs. 3, 5, 7, and 10, be correspondingly rotated, so that it will exhibit the corresponding amount at the aperture 37 of the case, and by depressing the key 26 until the finger 36 reaches the bottom of said notch said amount will be registered, as hereinafter described, and at the same time the key-lever 25 will by acting upon the segmental bar 7 of the lever 5 withdraw the detent 4 and permit the drawer 2 to open under the influence of the spring 3, giving access thereto for the deposit therein of the purchase money and for the purpose of obtaining change, if necessary, and the drawer 2 is afterward closed by hand. Upon releasing the key 26 the key-lever 25 will by the springs 30 and 31 be restored to its normal or zero position clear of the segmental bar 7, as shown at Fig. 3; but the dial 13 will remain locked with the amount exposed at the aperture 37 by the following means until certain other operations have been performed, as hereinafter described.

Upon the horizontal shaft 11 is fixed a ratchet-wheel 38, with which engages a weighted pawl 39, mounted upon an axis of motion 40 and provided with a tail 41, and the tail 41 of the pawl 39 is acted upon by an arm 42, fixed to a vertical rod 43, which is formed with a piston-like enlargement 44, working in a cylinder 45 against a spring 46, and the lower end of which rod 43 is provided with a cranked arm 47, terminating in a foot or platform 48, over which the key-lever 25 rests suspended in its normal position, so that by depressing the key 26 the key-lever 25 will in turn depress the foot 48 and through the rod 43 and arm 42 trip the pawl 39 and permit the dial 13 to return to its zero position under the influence of a spring 49, acting upon the segment 16. The registration of the amount of the purchase is effected concurrently with the rotation of the dial 13 in the traverse of the key-lever 25, as hereinafter described, and the dial 13 is, as hereinbefore described, held by the pawl 39 until the key-lever 25 has been restored to its zero position and depressed, and in order to prevent possible fraud by traversing and depressing at some point in its traverse the key-lever without rotating the dial, but so as to sound the alarm-bell, hereinafter described, and open the drawer, a weighted lever 50 is employed, which is pivotally mounted at 51 upon a bracket 52 and is provided with a notch 53, adapted to engage the key-lever 25 in its zero position, while it is formed with an inclined nose 54, so that it may be depressed by the key-lever 25 as it returns to zero, when said notch 53 will engage and lock the key-lever 25 and prevent its being traversed. In order to release the key-lever 25 at the proper time—that is to say, after the return to zero of the dial 13—the crank-pin 21 is provided with a prolongation 55, which in the return traverse thereof with the dial 13 engages the inclined nose 54 of the locking-lever 50, thereby depressing and holding depressed said lever 50 until the next traverse of the key-lever 25. As an additional precaution to prevent fraud a disk 60 is fixed upon the shaft 11 at the rear of the dial 13 and is provided with a depression 61 in the face thereof, and the pawl 39 is provided with a coacting spring-stud 62, which enters said depression, but in the traverse of the key-lever 25 and corresponding rotation of the dial 13 is compressed and rides against the face of said disk; but upon the key-lever being restored to its zero position and depressed, thereby lifting the pawl 39, the stud 62 is raised above the edge of the disk 60 and springing forward rides upon the edge thereof, thereby keeping the pawl 39 out of engagement with the ratchet-wheel 38 until the dial 13 has returned to its zero position, when the stud 62 will drop into the depression 61 of the disk 60 and permit the pawl 39 to fall into engagement with the ratchet-wheel 38.

In order to arrest the dial 13 in its zero position as it returns thereto under the influence of the spring 49, acting upon the segment 16, and also to prevent the dial 13 rebounding, and thereby giving false indications, the disk 12 is provided with a rearward projection 63, which comes against the lower jaw 64 of a forked or notched stop plate or lever 66, mounted upon an axis of motion 67 and provided with a counterbalance or pendulous tail 68, which strikes against a stop 69, by which means the upper jaw 65 of the forked stop is caused to momentarily swing forward and engage the projection 63 of the disk 12, thus preventing any rebounding action of the dial 13, and said jaw 65 after performing this work is immediately thrown out of engagement again with the projection 63 by gravity.

The dial 13 works synchronously with the key-lever 25 in its traverse—that is to say, whichever figure or number of the rack 35 indicating the amount of the purchase the key-lever 25 is traversed to the corresponding figure or number upon the dial 13 will appear at the aperture 37 of the case—and in order to register this amount the following arrangement of parts is employed:

Loosely mounted upon the shaft 11 is a drum 70, the periphery of which is divided and figured in a similar manner to the dial 13, and this drum 70 is rotated synchronously with the dial 13 during the traverse of the key-lever 25 by means of a ratchet-wheel 71, fixed upon the shaft 11, which engages a pawl 72, carried by the drum 70, and this arrangement at the same time permits the drum 70 to remain stationary during the return movement to zero of the dial 13, and in order to prevent any back action of the drum 70 a ratchet-wheel 73 is fixed to the bracket 10, forming the rear bearing of the shaft 11, and a pawl 74, carried by the drum 70, engages the same.

Upon the periphery of the drum 70 is a finger 75, and in connection therewith is arranged an ordinary counting apparatus 76, provided with the usual star-wheel 77, which is adapted to be advanced one tooth at a time by a moving object in the manner well known, and the finger 75 of the drum 70 once in every revolution of said drum engages the star-wheel 77 and rotates it the distance of one tooth. The counting apparatus 76 is provided with a dial having three apertures at which appear figures indicating the number of units, tens, and hundreds of dollars registered, while the fractions or cents can be read off upon the drum 70, a stationary pointer 78, carried by the counting apparatus, being employed to indicate the actual division upon the drum 70 containing the figures requiring to be read, and in order to enable a view to be obtained of the counting and registering apparatus the case is provided with a door 79, preferably secured by means of a lock and key.

It is desirable that the registration of each amount and the opening of the drawer 2 should be accompanied by an audible indication, and for this purpose a bell or gong 80 is employed which is provided with a hammer 81, carried by a bell-crank 82, mounted upon an axis of motion 83 and actuated by a spring 84, and this hammer 81 is retracted and released at each depression of the key-lever 25 to register the amount of a purchase by means of a rod 85, at its lower end pivotally connected to the rear end of the lever 5 and at its upper end working in a guide 86, which it very loosely fits, said rod 85 being provided with a tooth or projection 87, adapted to first engage the short arm of the bell-crank 82 and retract the hammer 81 and then to slip past the same, permitting the spring 84 to exert its influence and cause the hammer to sound the bell, and by reason of the spring 84 being attached to the rod 85 the tooth 87 is enabled to slip past the bell-crank in the return movement of said rod.

It will be understood that the details of construction of the machine may be to some extent varied without departing from the spirit of the invention.

Having now particularly described and ascertained the nature of the said invention and in what manner the same is to be performed, we declare that what we claim is—

1. In an automatic cash-register a dial provided with a circle of figures denoting sums of money, an inclosing case provided with an aperture adapted to display one of said figures or sums at a time, a segmental rack at the front of the machine divided and figured to correspond with the dial, a horizontal slot in the case adjacent to the rack, a key-lever at its inner end mounted upon axes of motion with capability of horizontal and vertical movement and at its outer end extending through the slot in the case adjacent to the rack and adapted to traverse and engage the latter, means for conveying only the outward horizontal traversing movement of the key-lever to the dial and converting it into rotary movement, means for retaining the dial in the position to which it has been moved while the key-lever returns to its zero position, a counting apparatus, means for causing the forward movements of the dial to give motion to the counter in such manner that each complete revolution whether made up of part revolutions or not is registered, means for releasing and returning to zero the dial upon the return to zero and depression of the key-lever and means for locking the key-lever in its zero position until the dial has returned to its zero position substantially as herein shown and described and for the purpose stated.

2. In an automatic cash-register a revoluble dial provided with a circle of figures denoting sums of money, a segmental rack located at the front of the machine and divided and figured to correspond with the dial, a key-lever at its inner end mounted upon axes of motion with capability of horizontal and vertical movement and at its outer end adapted to traverse the segmental rack, a beveled pinion fixed with the axis of the dial, a toothed segment engaging the pinion a spring for moving said toothed segment in one direction, a crank fixed with the axis of the toothed segment and adapted to loosely engage the key-lever in the outward horizontal traverse of the latter, means for retaining the dial and crank for the time being in the position to which they have been carried by the key-lever while the latter returns to its zero position, a counting apparatus, means for causing the forward movements of the dial to give motion to the counter in such manner that each complete revolution, whether made up of part revolutions or not, is registered, means for releasing and returning to zero the dial upon the return to zero and depression of the key-lever and means for locking the key-lever in its zero position until the dial has returned to its zero position substantially as herein shown and described and for the purpose stated.

3. In an automatic cash-register, a revoluble dial provided with a circle of figures denoting sums of money, a segmental rack located at the front of the machine and divided and figured to correspond with the dial, a key-lever at its inner end mounted upon axes of motion with capability of horizontal and vertical movement and at its outer end adapted to traverse the segmental rack, means for conveying only the outward horizontal traversing movement of the key-lever to the dial and converting it into rotary movement, a ratchet-wheel fixed with the shaft of the dial, a pawl engaging said wheel, and provided with a tail, a rod an arm carried by said rod for depressing the tail of the pawl and throwing the latter out of gear with the ratchet-wheel, a foot or platform fixed to the lower part of said rod adapted to be depressed by the key-lever in its zero position thus causing the return to zero of the dial means for locking the key-lever in its zero position until the dial has returned to zero, a counting apparatus, and means for causing the forward movements of the dial to give motion to the counter in such manner that each complete revolution whether made up of part revolutions or not is registered substantially as herein shown and described and for the purpose stated.

4. In an automatic cash-register, a revoluble dial provided with a circle of figures denoting sums of money, a segmental rack located at the front of the machine and divided and figured to correspond with the dial, a key-lever at its inner end mounted upon axes of motion with capability of horizontal and vertical movement and at its outer end adapted to traverse the segmental rack, means for conveying only the outward horizontal traversing movement of the key-lever to the dial and converting it into rotary movement, a ratchet-wheel fixed with the dial and a pawl engaging the same for retaining the dial in the position to which it has been moved while the key-lever returns to its zero position, means adapted to be acted upon by the key-lever in its zero position for raising the pawl and permitting the return to zero of the dial, means for causing the return to zero of the dial, means for locking the key-lever in its zero position until the dial has returned to zero, a disk fixed upon the dial-shaft and provided with a depression in its face a coacting spring-pin carried by the pawl and adapted in the raised position of the latter to ride upon the edge of the disk and hold the pawl out of gear until the depression again comes opposite the pin thus permitting the pawl to fall into engagement with the ratchet-wheel, a counting apparatus, and means for causing the forward movements of the dial to give motion to the counter in such manner that each complete revolution whether made up of part revolutions or not is registered substantially as herein shown and described and for the purpose stated.

5. In an automatic cash-register, a revoluble dial provided with a circle of figures denoting sums of money, a segmental rack located at the front of the machine and divided and figured to correspond with the dial, a key-lever at its inner end mounted upon axes of motion with capability of horizontal and vertical movement and at its outer end adapted to traverse the divided segmental rack, means for conveying only the outward horizontal traversing movement of the key-lever to the dial and converting it into rotary movement, means for retaining the dial in the position to which it has been moved while the key-lever returns to its zero position, a counting apparatus, means for causing the forward movements of the dial to give motion to the counter in such manner that each complete revolution whether made up of part revolutions or not is registered, means for releasing and returning to zero the dial upon the return to zero and depression of the key-lever means for locking the key-lever in its zero position until the dial has returned to zero means for returning the dial to zero a projection from the disk carrying the dial a notched or forked stop-plate having upper and lower jaws and pivotally mounted upon the frame of the machine and means for balancing the stop-plate in such manner that upon the return to zero of the dial the projection thereof will encounter the lower jaw of the stop-plate thereby arresting the dial at its zero position and the impact will momentarily throw the upper jaw forward to engage the projection and prevent the dial rebounding substantially as herein shown and described and for the purpose stated.

6. In an automatic cash-register a revoluble dial provided with a circle of figures denoting sums of money, a segmental rack located at the front of the machine and divided and figured to correspond with the dial, a key-lever at its inner end mounted upon axes of motion with capability of horizontal and vertical movement and at its outer end adapted to traverse the segmental rack, a crank provided with a crank-pin for conveying through suitable connections only the outward horizontal traversing movement of the key-lever to the dial and converting it into rotary movement, means for retaining the dial in the position to which it has been moved while the key-lever returns to its zero position, a counting apparatus, means for causing the forward movements of the dial to give motion to the counter in such manner that each complete revolution whether made up of part revolutions or not is registered, means for releasing and returning to zero the dial upon the return to zero and depression of the key-lever, a weighted lever having an inclined nose and provided with a notch adapted to engage the key-lever in its zero position and thus lock it, an extension upon the crank-pin adapted in the return movement of the crank and dial to come against the inclined nose of the weighted lever and depress the same thereby releasing the key-lever substantially as herein shown and described and for the purpose stated.

7. In an automatic cash-register a revoluble dial provided with a circle of figures denoting sums of money a segmental rack located at the front of the machine and divided and figured to correspond with the dial, a key-lever at its inner end mounted upon axes of motion with capability of horizontal and vertical movement and at its outer end adapted to traverse the segmental rack, means for conveying only the outward horizontal traversing movement of the key-lever to the dial and converting it into rotary movement, means for retaining the dial in the position to which it has been moved while the key-lever returns to its zero position, an ordinary counting apparatus operated by a star-wheel a drum loosely mounted upon the shaft of the dial means for causing the drum to rotate with the dial in its forward movements and to remain stationary during its return movements, divisions and figures upon the periphery of the drum corresponding with those of the dial, a pointer opposite the drum, a projection upon the drum adapted to engage the star-wheel of the counting mechanism in the revolution of the drum, means for releasing and returning to zero the dial upon the return to zero and depression of the key-lever and means for locking the key-lever in its zero position until the dial has returned to its zero position substantially as herein shown and described and for the purpose stated.

8. In an automatic cash-register a revoluble dial provided with a circle of figures denoting sums of money a segmental rack located at the front of the machine and divided and figured to correspond with the dial, a key-lever at its inner end mounted upon axes of motion with capability of horizontal and vertical movements and at its outer end adapted to traverse the segmental rack, means for conveying only the outward traversing movement of the key-lever to the dial and converting it into rotary movement, means for retaining the dial in the position to which it has been moved while the key-lever returns to its zero position, a rocking lever having at its front end a segmental bar coextensive with the arc traversed by the key-lever minus its zero position, a spring-actuated drawer, a detent carried by the rear end of the rocking lever and adapted to engage the drawer until the rocking lever is depressed by the key-lever, a counting apparatus means for causing the forward movements of the dial to give motion to the counter means for releasing and returning to zero the dial upon the return to zero and depression of the key-lever and means for locking the key-lever in its zero position until the dial has returned to its zero position substantially as herein shown and described and for the purpose stated.

9. In an automatic cash-register the combination of two mechanisms within one case the one to register purchases in cents and the other purchases in dollars each of such mechanisms consisting of a dial provided with a circle of figures denoting sums of money, a segmental rack at the front of the machine divided and figured to correspond with the dial, a key-lever at its inner end mounted upon axes of motion with capability of horizontal and vertical movement and at its outer end adapted to traverse and engage the rack, means for conveying only the outward traversing movement of the key-lever to the dial and converting it into rotary motion, means for retaining the dial in the position to which it has been moved while the key-lever returns to its zero position, a counting apparatus, means for causing the forward movements of the dial to give motion to the counter in such manner that each complete revolution whether made up of part revolutions or not is registered, means for releasing and returning to zero the dial upon the return to zero and depression of the key-lever and means for locking the key-lever in its zero position until the dial has returned to its zero position substantially as herein shown and described and for the purpose stated.

ANDREW GILLIGAN MACCULLOCH.
    HERBERT DICKINSON.

Witnesses:
 C. MELBOURNE WHITE,
 C. H. WHITE.